(12) United States Patent
Jang et al.

(10) Patent No.: US 8,033,513 B2
(45) Date of Patent: Oct. 11, 2011

(54) DISPLAY DEVICE

(75) Inventors: Woon Geun Jang, Gumi-si (KR); Mun Hwan Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 12/307,624

(22) PCT Filed: May 22, 2007

(86) PCT No.: PCT/KR2007/002473
§ 371 (c)(1),
(2), (4) Date: Sep. 11, 2009

(87) PCT Pub. No.: WO2008/004759
PCT Pub. Date: Jan. 10, 2008

(65) Prior Publication Data
US 2010/0032532 A1 Feb. 11, 2010

(30) Foreign Application Priority Data
Jul. 7, 2006 (KR) ........................ 10-2006-0063725

(51) Int. Cl.
*A47F 5/00* (2006.01)
*G06F 1/16* (2006.01)
(52) U.S. Cl. ................. 248/122.1; 248/123.11; 248/917; 248/919; 248/923; 361/679.02
(58) Field of Classification Search ............... 248/122.1, 248/149, 176.3, 123.11, 917, 919, 922, 921, 248/923, 133; 361/679.02, 679.21
See application file for complete search history.

(56) References Cited

U.S. PATENT DOCUMENTS

| | | | |
|---|---|---|---|
| 6,822,857 B2 | 11/2004 | Jung et al. | |
| 7,593,218 B2* | 9/2009 | Hwang et al. | 361/679.21 |
| 7,628,365 B2* | 12/2009 | Lee | 248/297.21 |
| 7,669,812 B2* | 3/2010 | Yun | 248/162.1 |
| 7,677,509 B2* | 3/2010 | Jang | 248/176.1 |
| 7,841,567 B2* | 11/2010 | Wang | 248/136 |
| 2005/0082459 A1 | 4/2005 | Liu et al. | |
| 2005/0247832 A1 | 11/2005 | Cho et al. | |
| 2007/0272809 A1* | 11/2007 | Jang | 248/133 |

FOREIGN PATENT DOCUMENTS

| | | |
|---|---|---|
| EP | 1 626 223 A2 | 2/2006 |
| EP | 1 821 029 A2 | 8/2007 |
| EP | 1 855 045 A1 | 11/2007 |
| EP | 1 860 366 A2 | 11/2007 |
| JP | 2004-29953 A | 1/2004 |
| JP | 2005-141191 A | 6/2005 |
| KR | 10-1999-0032116 A | 5/1999 |
| KR | 2000-001380 U | 1/2000 |
| KR | 2002/0009960 | 2/2002 |
| KR | 2003/0015642 | 2/2003 |
| WO | WO 03/056415 | 7/2003 |

OTHER PUBLICATIONS

Korean Decision to Grant a Patent dated Nov. 2, 2007 for Application No. 10-2006-0063725.

* cited by examiner

*Primary Examiner* — Anita M King
(74) *Attorney, Agent, or Firm* — KED & Associates, LLP

(57) ABSTRACT

A display device is disclosed. A display device includes a connecting block (40) rotatably fastened to an end of a stand assembly (20); a head mount (43) vertically movable with respect to the connecting block (40); and a locking unit that selectively locks the motion of the head mount (43) as the connecting block (40) rotates.

20 Claims, 8 Drawing Sheets

[Fig. 6]
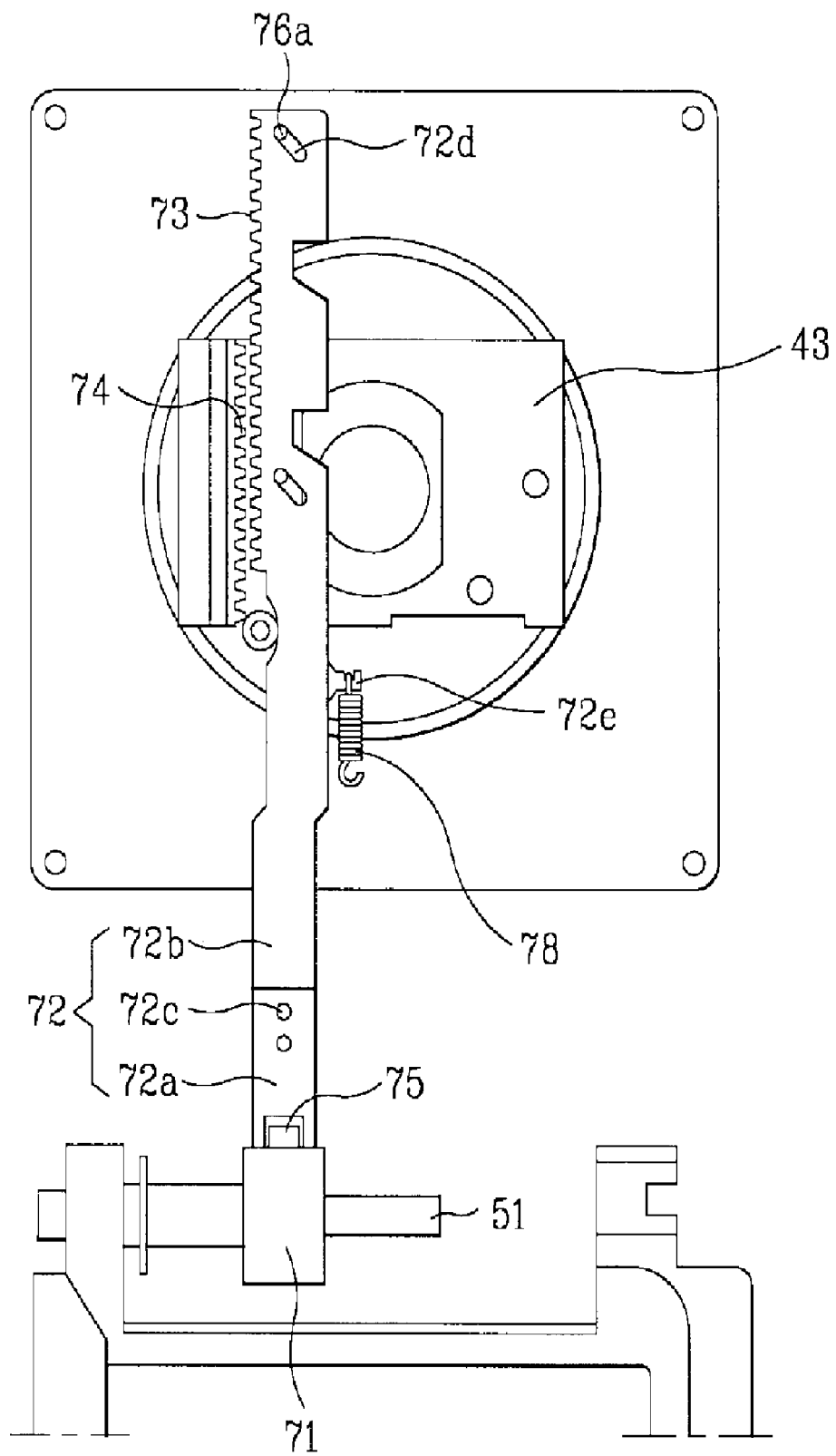

[Fig. 7]
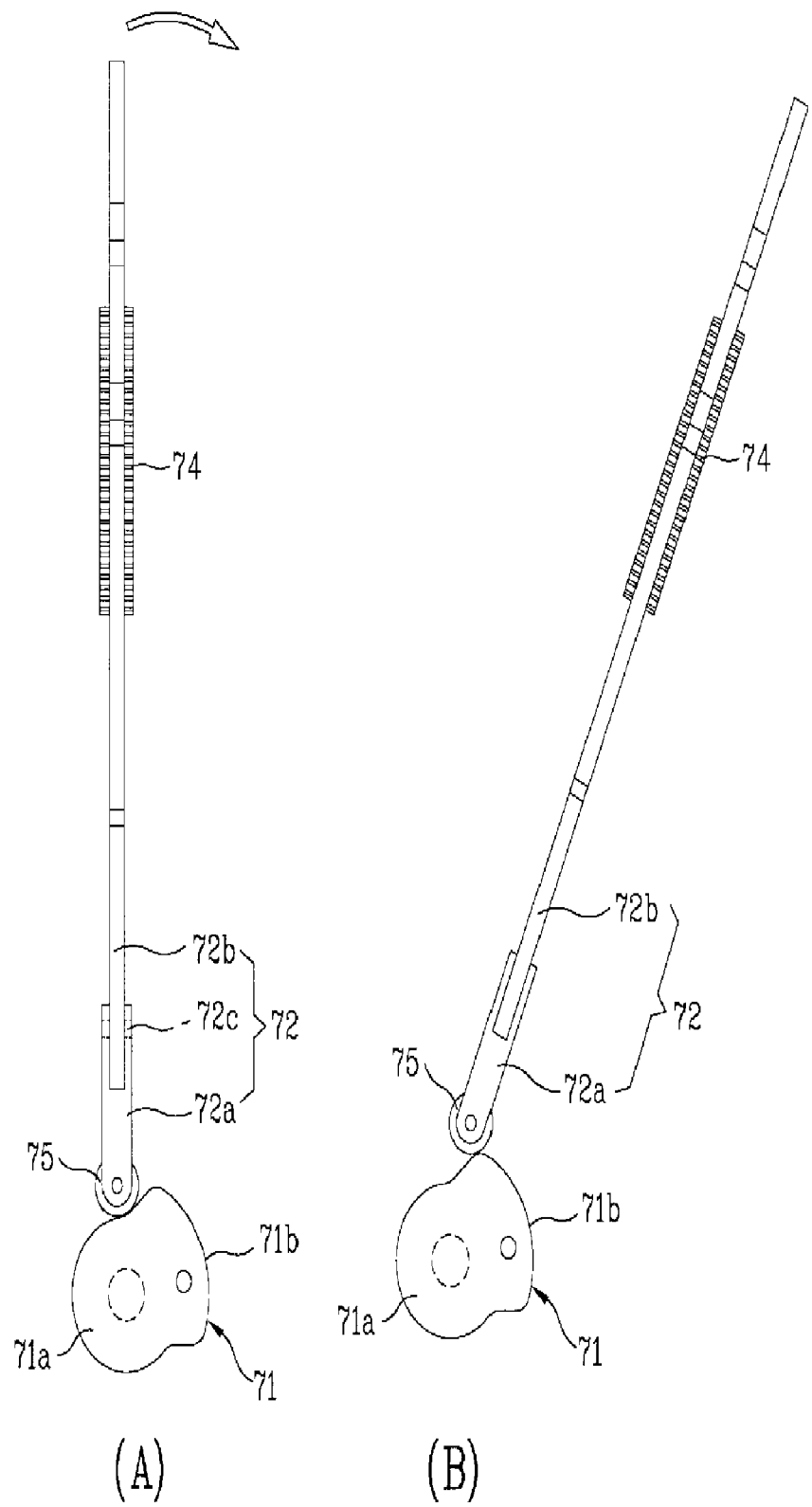

[Fig. 8]
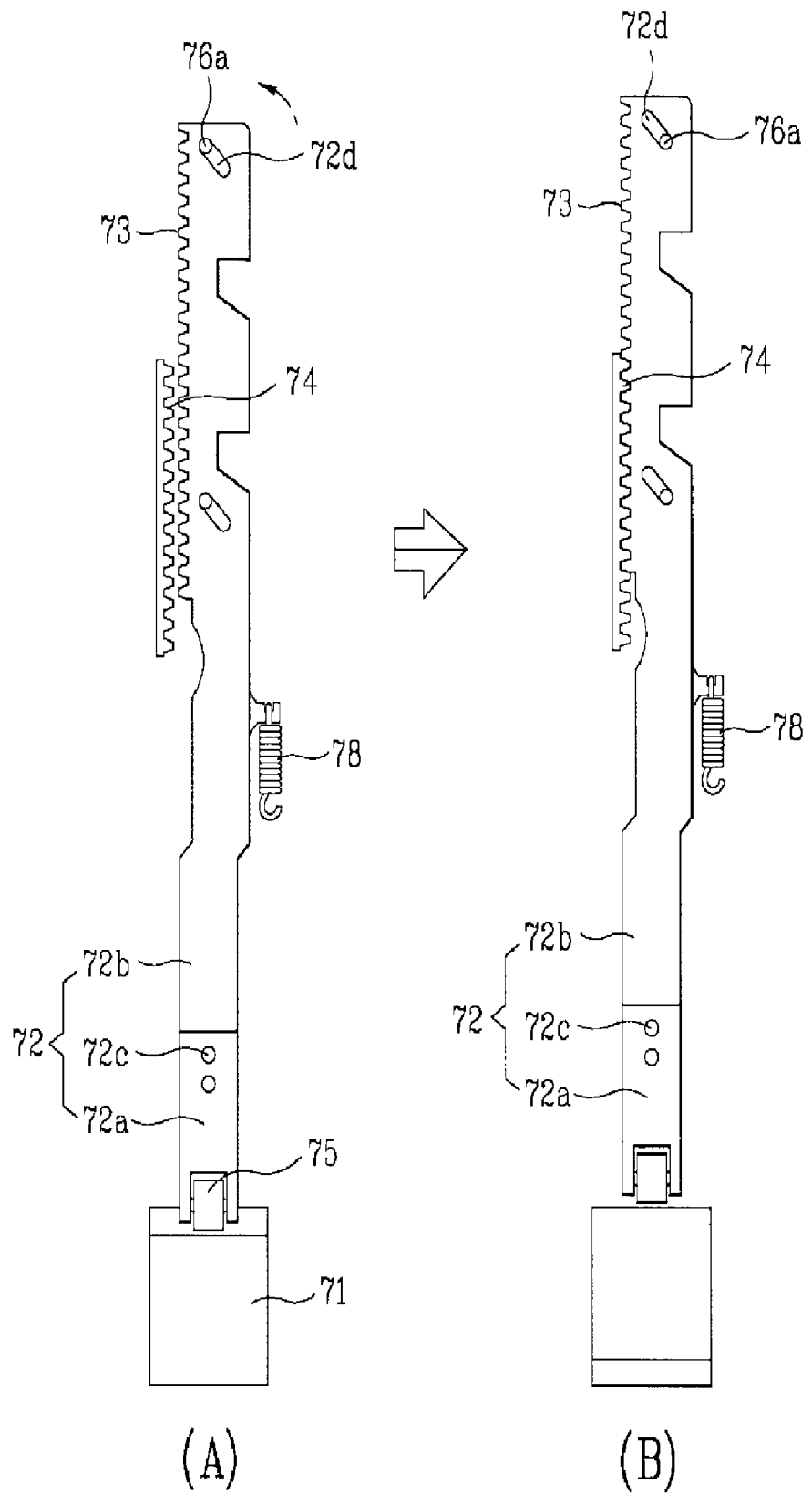

DISPLAY DEVICE

TECHNICAL FIELD

The present invention relates to a display device. More particularly, the present invention relates to a display device capable of adjusting an angle/height of a display part.

BACKGROUND ART

In general, a display device such as a LCD, PDP or the like should have a stand that supports a monitor, specifically, a display part and the display device can be usable on a desk or table. The stand is secured to a rear surface of the monitor by means of a hinge assembly. Thus, a user can adjust an angle of the monitor as he/she wants. Recently, such display devices have been under development, as a user can conveniently adjust the height of a monitor provided in as he/she wants to enhance convenience.

Referring to FIGS. 1 and 2, a conventional display device having an angle/height adjustment function will be described.

A conventional display device includes a monitor 1, a stand 2 and a base 3. The monitor 1 displays images and the stand 2 is fastened to the monitor 1. The base 3 supports the stand 2 on a surface of a desk or table.

The monitor 1 is vertically sliding movable and installed on a connecting block 4 connected to an upper end of the stand 2. The connecting block 4 is rotatably fastened to the stand 2 by a hinge assembly 2 installed at an upper end of the stand 2 and the connecting block 4 is rotatable forwardly/downwardly about a hinge assembly 2. Thus, when a use moves the monitor 1 forwardly/downwardly, the connecting block 4 rotates about the hinge assembly 5 and the angle (θ) of the monitor 1 is adjusted.

An elastic member (not shown) such as a spiral spring is provided in the connecting block 4. The elastic member supplies an elasticity corresponding to the load (W) of the monitor 1 to the monitor 1 and it supports the monitor 1 at a predetermined height. The spiral spring uniformly supplies a predetermined elastic force (F) to the monitor 1 to support the monitor 1, regardless of displacement. Thus, when the user vertically moves the monitor 1 with respect to the connecting block 4 and the external force applied to the monitor 1 is removed, the monitor 1 keeps its position due to the elastic force of the spiral spring.

A lower end of the stand 2 is hingedly fastened to the base part 3 by a lower hinge assembly 6 and the stand 2 is rotatable about the base part 3.

However, the conventional display device has following problems.

As shown in FIG. 1, when the monitor 1 is not oblique to the stand 2, the load of the monitor 1 is only vertically downward. The load (W) of the monitor 1 is substantially the same as the elastic force (F) of the spiral spring (not shown) supporting the monitor 1 on the connecting block 4.

However, as shown in FIG. 2, if the user rotates the monitor 1 backwardly to adjust the angle (θ) of the monitor 1 at more than a predetermined angle, a center of the monitor gravity is moved and a component of force is changed. Thereby, the balance between the elastic force (F) of the spiral spring (not shown) and the load of the monitor 1 in a direction of the elastic force (F) is lost.

More specifically, when the monitor 1 rotates at an angle (θ), a load (W1) of the monitor 1 corresponding to the elasticity of the spiral spring (not shown) is W cos θ, which is smaller than the elasticity (F) of the spiral spring (not shown). Accordingly, there might be an Auto-lift-up which means that the monitor moves upward slightly due to the elasticity of the spiral spring. If the auto-lift-up occurs, the angle of the monitor may not be adjusted as a user wants.

DISCLOSURE OF INVENTION

Technical Solution

Accordingly, the present invention is directed to a display device.

An object of the present invention is to provide a display device which can prevent an auto-lift-up of a monitor.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a connecting block rotatably fastened to an end of a stand assembly; a head mount vertically movable with respect to the connecting block; and a locking unit that selectively locks the motion of the head mount as the connecting block rotates.

The locking unit may include a cam provided on a rotation shaft of the stand assembly; and a cam follower selectively locked to the head mount, being contacted with the cam.

Preferably, the cam follower includes a first cam follower having an end contacted with the cam; and a second cam follower having an end rotatably connected to the first cam follower and the other end selectively locked to the head mount. Here, the motion direction of the first cam follower may be oblique to the motion direction of the second cam follower at a predetermined angle. For that, the display device according to the present invention further includes a guide unit that guides the motion of the second cam follower. The guide unit may include a guide hole formed at the second cam follower and a guide pin provided in the guide hole.

The display device may further include a guide bracket that guides the motion of the cam follower. The guide pin may be provided at the guide bracket.

The display device according to the present invention may further include an elastic member that elastically supports the second cam follower.

A first engaging part may be provided at the second cam follower and a second engaging part may be provided at the head mount to be selectively engaged to the first engaging part. The first engaging part and the second engaging part may be rack gears, respectively. Also, a cam roller may be provided at a lower end of the first cam follower.

In another aspect of the present invention, the head mount and the can follower are engaged each other in the same direction as the rotation direction of the connecting block.

In a further aspect of the present invention, the locking unit may include a motion part that moves in accordance with the rotation of the connecting block; and a guide part that changes a motion direction of the motion part. The motion part may include a cam and at least one cam follower contacted with the cam. Preferably, the cam follower includes a first cam follower having an end contacted with the cam; and a second cam follower having an end rotatably connected to the first cam follower and the other end selectively locked to the head mound. The guide part may include a guide hole formed on the motion part and a guide pin provided in the guide hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a front view of FIG. 3;

FIG. 7 is a side view illustrating an operation of the display device according to the embodiment of the present invention; and FIG. 8 is a front view of FIG. 7.

MODE FOR THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 1:
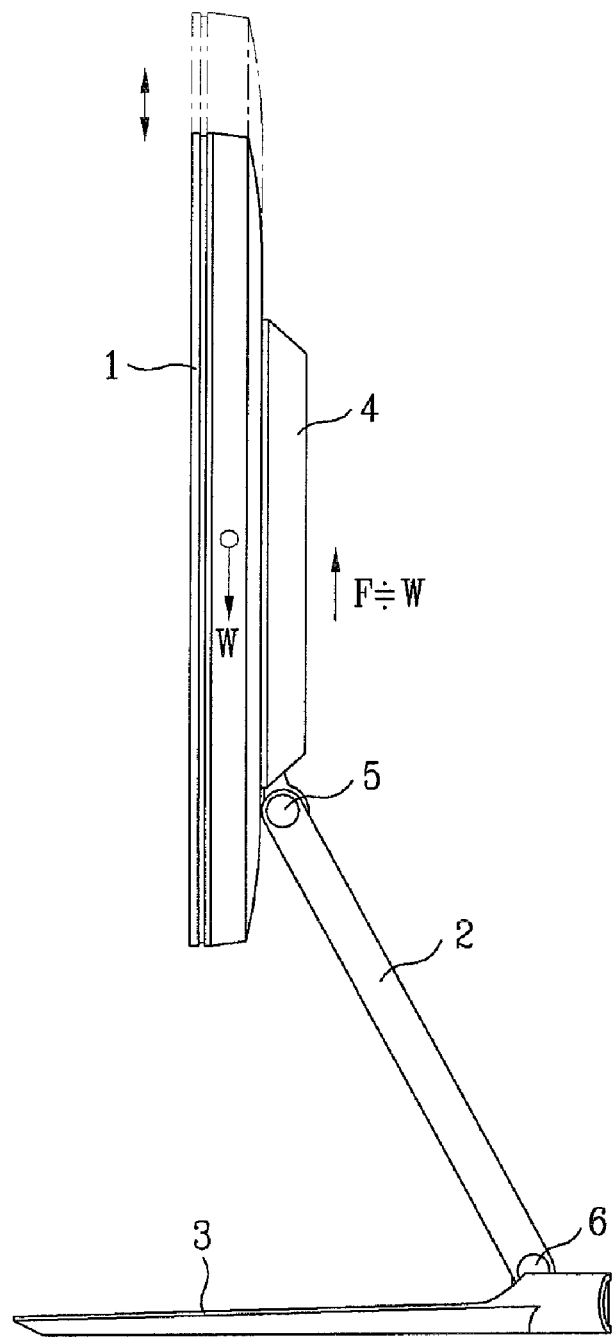
FIG. 1 is a side view schematically illustrating a conventional display device.
Figure 2:
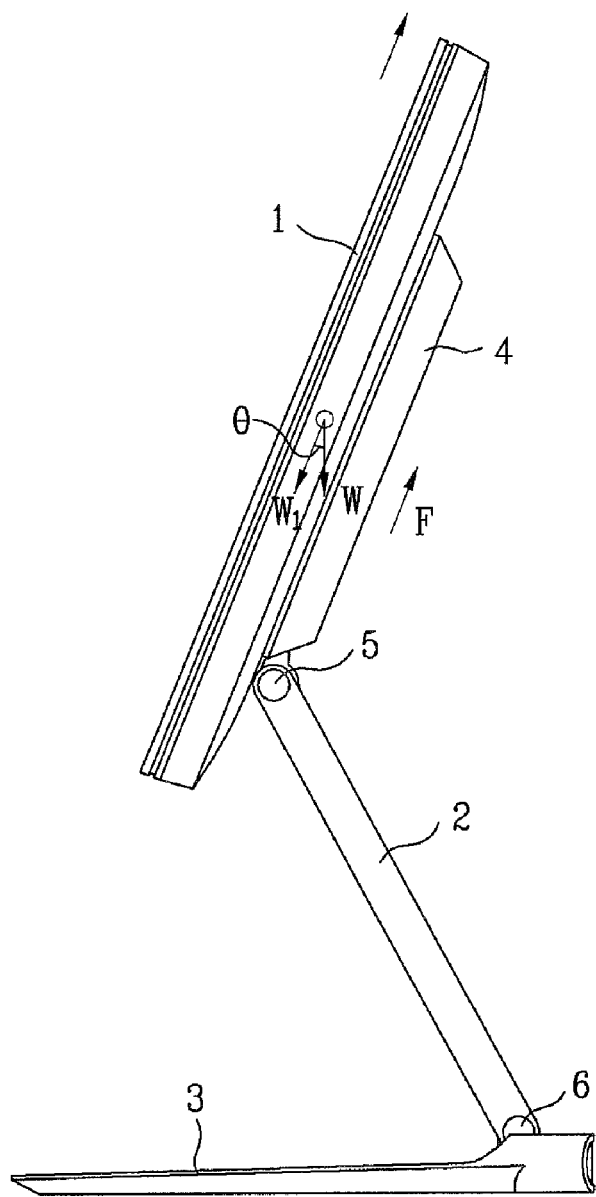
FIG. 2 is a side view illustrating an Auto-lift-up which may occur when an angle of a monitor is adjusted by a user in the conventional display device.
Figure 3:
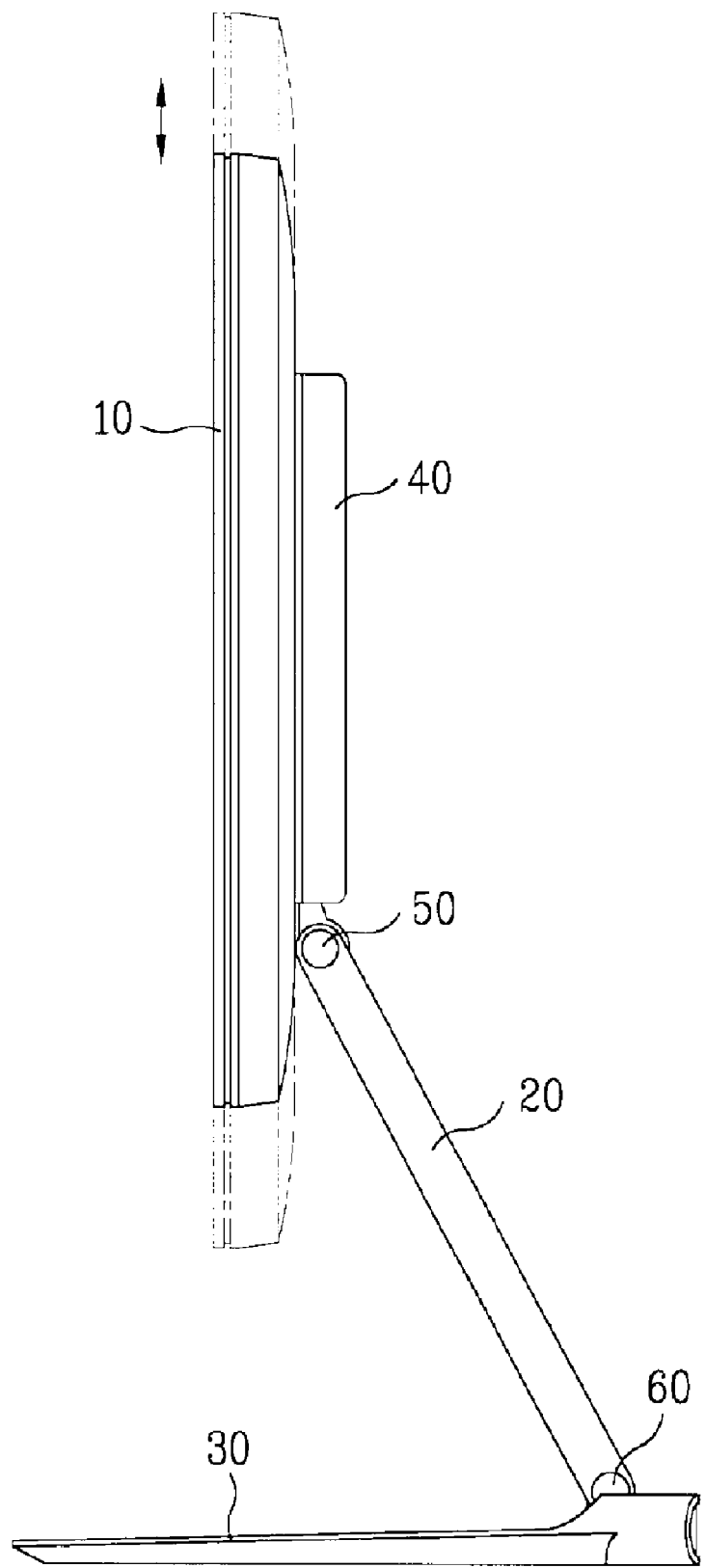
FIG. 3 is a side view illustrating an embodiment of a display device according to the present invention.

As shown in FIG. 3, a display device according to the present invention includes a monitor 10, a stand 20 and a base part 30. The monitor 10 displays images and the stand 20 supports the monitor 10. The base part 30 supports the stand 20 on a desk or table. Preferably, the stand 20 is a dual hinge structure including an upper hinge assembly 50 and a lower hinge assembly 60.

Also, a locking unit is provided in the display device according to the present invention to prevent an auto-lift-up of the monitor 10, which will be described in detail later.

Figure 4:
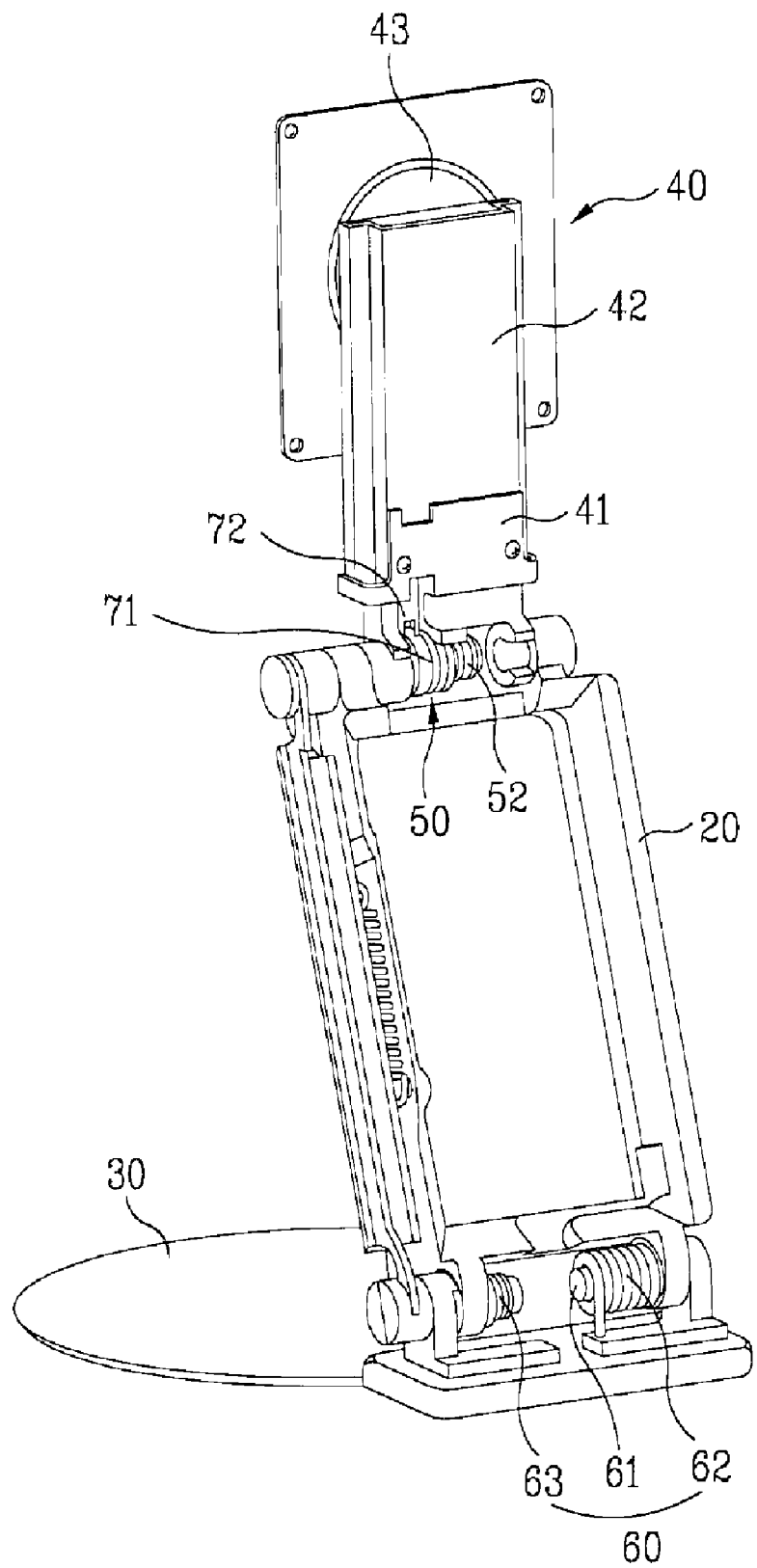
FIG. 4 is a perspective view illustrating key parts for supporting a monitor of the display device shown in FIG. 3.

In reference to FIG. 4, a structure of the display device will be schematically described first.

The lower hinge assembly 60 may include a rotation shaft 61, a plurality of washers 63 and a torsion spring 62, like or similar to a hinge assembly disclosed in STAND ASSEMBLY OF MONITOR of Korean Patent Publication No. 10-2005-0107285 which is published on Nov. 11, 2005.

Also, a connecting unit 40 is installed on an upper portion of the stand 20 to connect the monitor 10 to the stand, in a state of the monitor 10 being vertically movable. A lower end of the connecting unit 40 is connected to the stand 20 by a hinge assembly 50 provided on an upper end of the stand 20.

The hinge assembly 50 may include a rotation shaft 51 (see FIG. 5) and a torque generation member. The rotation shaft 51 is rotatably installed at the upper end of the stand 20. The torque generation member supplies a reaction force for the load of the monitor 10 to the rotation shaft 51 and thus the monitor 10 keeps the angle at which the monitor 10 has rotated. The torque generation member may be configured of a plurality of washers (not shown) and a torsion spring 52, like or similar as disclosed in the above STAND ASSEMBLY OF MONITOR of Korean Patent Publication No. 10-2005-0107285 which is published on Nov. 11, 2005.

In reference to FIG. 4, the connecting unit will be described in detail.

A first connecting block 41 is connected to the rotation shaft 51 of the hinge assembly 50 and a second connecting block 42 is coupled to an upper portion of the first connecting block 41. A head mount 43 mounted on a rear surface of the monitor 10 is vertically movable along the second connecting block 42. According to this embodiment, the first connecting block 41 and the second connecting block 42 are provided separately but, alternatively, may be fabricated as one body in an injection molding method.

Figure 5:
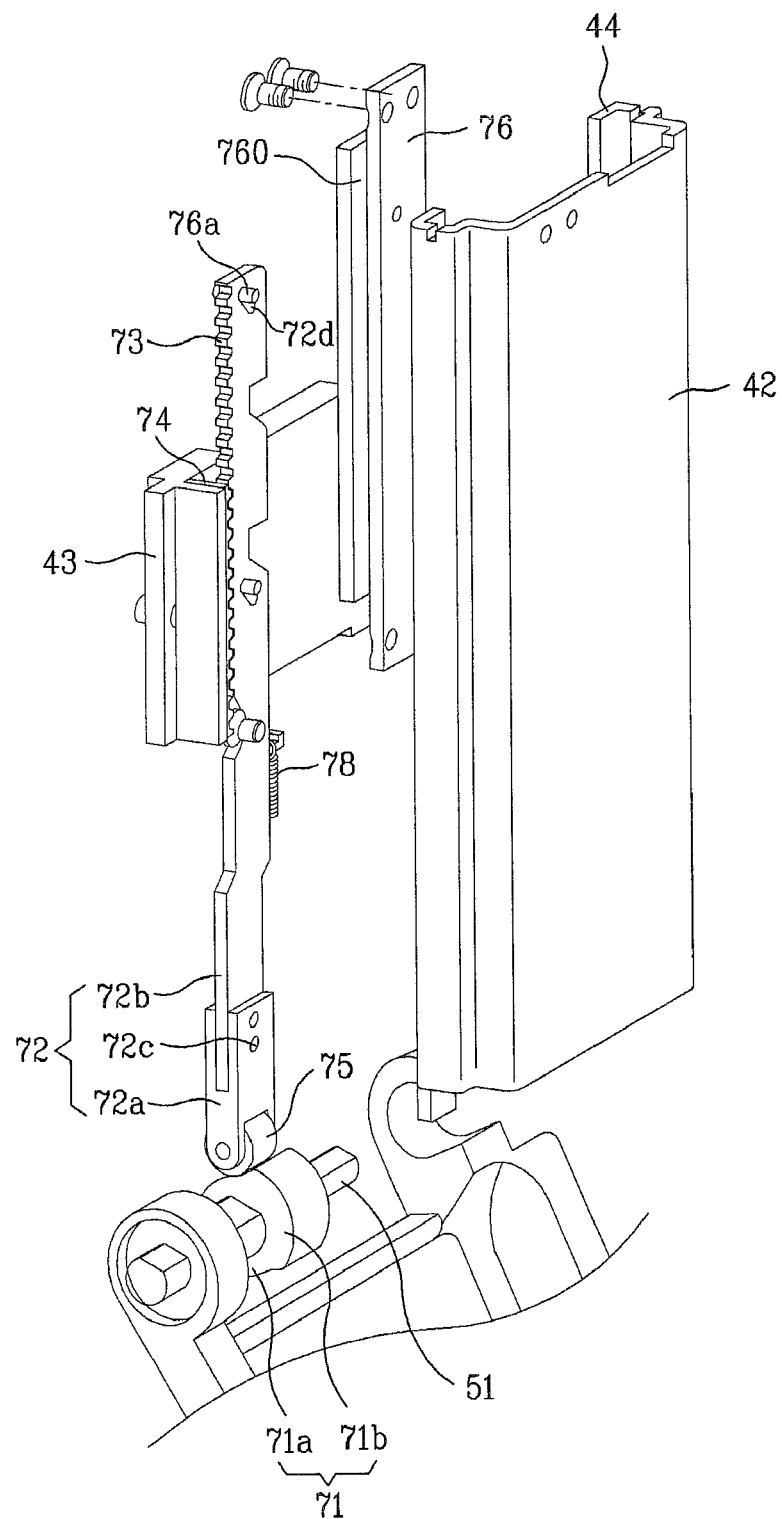
FIG. 5 is an exploded perspective view of FIG. 3.

In reference with FIGS. 5 and 6, a pair of guide rails 44 may be provided at both opposite sides of the second connecting block 42, respectively. Both opposite sides of the head mount 43 are coupled to the pair of guide rails 44, respectively. Thus, when a user moves the monitor 10 vertically, both opposite sides of the head mount 43 are vertically moving along the guide rails 44 of the second connecting block 42 to adjust the height of the monitor 10.

Although not shown in the drawings, a spiral spring (not shown) is disposed between the second connecting block 42 and the head mount 43 to support the load of the monitor 10. A side of the spiral spring (not shown) is secured to the second connecting block 42 and the other side of the spiral spring (not shown) is secured to the head mount 43. Thereby, elasticity is supplied to the head mount 43 to support the load of the monitor 10.

As mentioned above, the locking unit is provided to prevent the auto-lift-up caused as the monitor rotates. That is, the locking unit selectively locks the vertical motion of the head mount 43 as the connecting block to which the monitor is fastened rotates.

The locking unit may include a motion part, a guide part and a locking part. The motion part moves as the connecting block rotates and the guide part changes a motion direction of the motion part. Also, the locking part selectively locks the motion of the head mount. It is preferred that the motion part perpendicularly moves as the connecting block rotates. The motion part may be embodied in various ways and it is preferred that the motion part includes a cam and at least one cam follower contacted with the cam.

In reference to FIGS. 5 and 6, the locking unit will be described in detail.

A cam 71 is provided at the shaft 51 of the hinge assembly 50 and a cam follower 72 is connected to the cam 71. Preferably, the cam 71 includes a first cam 71a having a substantially circular shape and a second cam 71b extended outwardly from the first cam 71a, having a larger diameter than a diameter of the first cam 71a. A lower end of the cam follower 72 moves upwardly/downwardly (Y shaft direction), a forwardly/backwardly (Z shaft direction) and a left-and-right direction (X shaft direction) as the cam 71 rotates, being contacted with an outer circumferential surface of the cam 71.

A first engaging part 73 is provided at the cam follower 72. A second engaging part 74 is provided at the head mount 43 to be engaged to the first engaging part 73. Preferably, the first engaging part 73 and the second engaging part 74 may be rack gears.

The cam follower 72 may include a first cam follower 72a and a second cam follower 72b. The first cam follower 72a is contacted with the cam 71. The second cam follower 72b connected to an upper portion of the first cam follower 72a to rotate about a hinge shaft 72c (Z shaft). Preferably, a cam roller 75 is installed at a lower end of the first cam follower 72a to roll along an outer circumferential surface of the cam 71.

A guide hole 72d may be provided on the second cam follower 72b and a guide pin 76a is provided in the guide hole 72d. Preferably, the guide hole 72d is a hollow which is oblique at a predetermined angle. The guide hole 72d and the guide pin 76a are kinds of guide parts that rotate the second cam follower 72b about the hinge shaft 72c.

More specifically, when the first cam follower 72a moves upwardly/downwardly, the second cam follower 72b also moves upwardly/downwardly. When the second cam follower 72b moves upwardly/downwardly, the guide hole 72d is guided by the guide pin 76a to rotate the second cam follower 72b about the hinge shaft 72c. Thus, the first rack gear 73 (first engaging part) may be coupled/separated to/from the second rack gear 74 (second engaging part) in a left-and-right direction (X shaft direction).

By the way, a guide bracket 76 may be secured to the second connecting block 42 to guide the motion of the second cam follower 72b. A recess part 760 is formed on a surface of the guide bracket 76 and the second cam follower 72b may be inserted in the recess part 760.

The guide pin 76a may be provided on the second connecting block 42. If the guide bracket 76 is used, the guide pin 76a may be provided on the guide bracket 76. Alternatively, though not shown in the drawings, the guide pin 76a may be formed on the second cam follower 72b and the guide hole corresponding to the guide pin 76a may be provided on the second connecting block 42 or the guide bracket 76.

An elastic member which is a coil spring 78 in this embodiment may be installed in a lower portion of the cam follower 72 to elastically support the cam follower 72. An upper end of the coil spring 78 is coupled to a first securing protrusion 72e formed on a surface of the cam follower 72 and a lower end of the coil spring 78 is coupled to a second securing protrusion (not shown) projected from a lower portion of the guide bracket 76. Thus, the coil spring 78 supplies elasticity to the cam follower 72 in a downward direction.

In reference to FIGS. 7 and 8, an operation of the display device according to the embodiment of the present invention will be described.

Firstly, an operation of monitor height adjustment will be described.

When the oblique angle of the monitor 10 is within a predetermined angle, the first rack gear 73 and the second rack gear 74 of the locking unit are not engaged each other. Thus, once a user applies a power to an upper or lower portion of the monitor 10, the head mount 43 is sliding along the guide rails 44 of the second connecting block 42 upwardly or downwardly. At this time, when the user stops the monitor 10 at a height he/she wants, the monitor 10 is supported by the elasticity of the spiral spring (not shown) at the height and the adjusted height of the monitor 10 is kept.

Next, an operation of the oblique angle adjustment will be described.

As shown in FIGS. 7A and 7B, when the user grabs the monitor 10 and applies a power to the monitor 10 backwardly, the monitor 10, the head mount 43 connected to the monitor 10, the first connecting block 41 and the second connecting block 42 are rotating about the rotation shaft 51 (in a clockwise direction as shown in FIG. 7).

The cam roller 75 of the first cam follower 72a is moving from the first cam 71a of the cam 71 toward the second cam 71b. Hence, the first cam follower 72a and the second cam follower 72b are moving upwardly.

Here, as shown in FIG. 8, since the second cam follower 72b moving upwardly is guided along the guide hole 76b of the guide pin 76a, the second cam follower 72b is moving in a left-and-right direction as rotating about the hinge shaft 72c, and then the second cam follower 72b is moving toward the second rack gear 74 provided at the head mount 43. Since the load due to the rotation of the monitor 10 is not changed much in an initial part of the monitor rotation, the auto-lift-up of the monitor 10 is not caused.

When the monitor 10 rotates at a predetermined angle such as 30 degree, the cam roller 75 of the first cam follower 72a is positioned at an outer circumferential surface of the second cam 71b of the cam 71. Hence, the first rack gear 73 of the second cam follower 72b is engaged to the second rack gear 74 of the head mount 43 completely. Thereby, the vertical motion of the head mount 43 is locked not to slide upwardly/downwardly and the head mount 43 is fastened to the second connecting block 42. Thus, although the user rotates the monitor 10 further, the monitor 10 is not automatically lifted by the elasticity of the spiral spring 45 but the monitor 10 keeps its position.

According to the above embodiment of the present invention, it is presented that the cam follower 72 includes the first cam follower 72a and the second cam follower 72b. However, the present invention is not limited thereto. For example, one cam follower may be used and the one cam follower performs a locking function as moving upwardly or downwardly. Since the engaging direction of an engaging part is the same as the rotation direction of the monitor (forward/backward direction), it is preferred that the position of the engaging part is adjusted. In this case, since the engaging direction of the engaging part is the same as the rotation direction of the monitor (forward/backward direction), the locking unit may be relatively thick.

As mentioned before, the present invention has following advantageous effects as follows.

First, when the monitor is rotated more than a predetermined angle, the monitor is fastened to the connecting unit not to be slide. Thereby, the present invention has an advantageous effect that an auto-lift-up of the monitor can be prevented. That is, a user can adjust the angle of the monitor as he/she wants and thus user satisfaction may be enhanced.

Especially, in case that the cam follower of the locking unit is configured of the first and second cam follower, the engaging direction is substantially perpendicular (left-and-light direction) to the rotation direction of the monitor (forward/backward direction). Thus, the first and second rack gear are engaged each other securely and precisely. Also, the thickness of the connecting unit in a forward/backward direction may not increase. Thereby, the present invention has another advantageous effect that a display device with a slim structure may be embodied.

INDUSTRIAL APPLICABILITY

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:
1. A display device comprising:
a connecting block rotatably fastened to an end of a stand assembly;

a head mount vertically movable with respect to the connecting block;

a locking unit that selectively locks motion of the head mount as the connecting block rotates, wherein the locking unit includes a cam provided on a rotation shaft of the stand assembly, and a cam follower selectively locked to the head mount, being contacted with the cam, and wherein the cam follower includes a first cam follower having an end contacted with the cam, and a second cam follower having a first end rotatably connected to the first cam follower and a second end selectively locked to the head mount.

2. The display device of claim 1, wherein the motion direction of the first cam follower is oblique to a motion direction of the second cam follower at a predetermined angle.

3. The display device of claim 2, further comprising a guide unit that guides the motion of the second cam follower.

4. The display device of claim 3, wherein the guide unit comprises a guide hole formed at the second cam follower and a guide pin provided in the guide hole.

5. The display device of claim 4, further comprising a guide bracket that guides the motion of the cam follower.

6. The display device of claim 5, wherein the guide pin is provided at the guide bracket.

7. The display device of claim 1, further comprising an elastic member that elastically supports the second cam follower.

8. The display device of claim 1, wherein a first engaging part is provided at the second cam follower and a second engaging part is provided at the head mount to be selectively engaged to the first engaging part.

9. The display device of claim 8, wherein the first engaging part and the second engaging part are rack gears, respectively.

10. The display device of claim 1, wherein a cam roller is provided at a lower end of the first cam follower.

11. The display device of claim 1, wherein the head mount and the cam follower are engaged with each other in a same direction as a rotation direction of the connecting block.

12. The display device of claim 11, further comprising a guide unit that guides the rotation of the cam follower.

13. The display device of claim 12, wherein the guide unit comprises a guide hole formed at the cam follower and a guide pin provided in the guide hole.

14. The display device of claim 1, wherein the locking unit comprises a motion part that moves in accordance with a rotation of the connecting block and a guide part that changes a motion direction of the motion part.

15. The display device of claim 14, wherein the motion part comprises a cam and at least one cam follower contacted with the cam.

16. The display device of claim 14, wherein the guide part comprises a guide hole formed on the motion part and a guide pin provided in the guide hole.

17. A display device comprising:

a connecting block rotatably fastened to an end of a stand assembly;

a head mount vertically movable with respect to the connecting block; and a locking unit selectively locks motion of the head mount as the connecting block rotates, wherein the locking unit includes a motion part that moves in accordance with the rotation of the connecting block and a guide part that changes a motion direction of the motion part, wherein the motion part includes a cam and at least one cam follower contacted with the cam, and wherein the cam follower includes a first cam follower having an end contacted with the cam, and a second cam follower having a first end rotatably connected to the first cam follower and a second end selectively locked to the head mount.

18. The display device of claim 17, wherein the motion direction of the first cam follower is oblique to a motion direction of the second cam follower at a predetermined angle.

19. The display device of claim 18, further comprising a guide unit that guides the motion of the second cam follower.

20. The display device of claim 19, wherein the guide unit comprises a guide hole formed at the second cam follower and a guide pin provided in the guide hole.

* * * * *